US012169738B2

(12) United States Patent
Helstroom et al.

(10) Patent No.: US 12,169,738 B2
(45) Date of Patent: *Dec. 17, 2024

(54) ALLOCATING COMPUTING RESOURCES BASED ON USER INTENT

(71) Applicant: Google LLC, Mountain View, CA (US)

(72) Inventors: David J. Helstroom, Palo Alto, CA (US); Patricia Weir, San Francisco, CA (US); Cameron Cody Smith, San Francisco, CA (US); Zachary A. Hirsch, Sunnyvale, CA (US); Ulric B. Longyear, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,981

(22) Filed: Nov. 20, 2023

(65) Prior Publication Data

US 2024/0086240 A1 Mar. 14, 2024

Related U.S. Application Data

(63) Continuation of application No. 17/444,609, filed on Aug. 6, 2021, now Pat. No. 11,847,494, which is a (Continued)

(51) Int. Cl.
*G06F 9/50* (2006.01)
(52) U.S. Cl.
CPC .............. *G06F 9/50* (2013.01); *G06F 9/5005* (2013.01); *G06F 9/5011* (2013.01);
(Continued)
(58) Field of Classification Search
CPC ........ G06F 9/50; G06F 9/5005; G06F 9/5011; G06F 9/5016; G06F 9/5022;
(Continued)

(56) References Cited

U.S. PATENT DOCUMENTS 4,744,028 A 5/1988 Karmarkar
7,712,100 B2 5/2010 Fellenstein et al.
(Continued)

OTHER PUBLICATIONS

Ruiz-Alverez et al., "A Model and Decision Procedure for Data Storage in Cloud Computing," Proceedings of the IEEE/ACM International Symposium on Cluster, Cloud, and Grid Computing. CCGrid 'May 13-16, 12, 2012, 9 pages.
(Continued)

*Primary Examiner* — Charles M Swift
(74) *Attorney, Agent, or Firm* — Honigman LLP; Brett A. Krueger

(57) ABSTRACT

Methods, systems, and apparatus, including computer programs encoded on a computer storage medium, for allocating computing resources. In one aspect, a method includes receiving intent data specifying one or more computing services to be hosted by a computing network, requested characteristics of computing resources for use in hosting the computing service, and a priority value for each requested characteristic. A budget constraint is identified for each computing service. Available resources data is identified that specifies a set of available computing resources. A resource allocation problem for allocating computing resources for the one or more computing resources is generated based on the intent data, each budget constraint, and the available resources data. At least a portion of the set of computing resources is allocated for the one or more computing services based on results of evaluating the resource allocation problem to meet a particular resource allocation objective.

20 Claims, 6 Drawing Sheets

Related U.S. Application Data continuation of application No. 16/428,251, filed on May 31, 2019, now Pat. No. 11,086,676, which is a continuation of application No. 15/291,722, filed on Oct. 12, 2016, now Pat. No. 10,310,898, which is a continuation of application No. 14/196,518, filed on Mar. 4, 2014, now Pat. No. 9,495,211.

(52) U.S. Cl.
CPC .......... *G06F 9/5016* (2013.01); *G06F 9/5022* (2013.01); *G06F 9/5027* (2013.01); *G06F 9/5033* (2013.01); *G06F 9/5038* (2013.01); *G06F 9/5044* (2013.01); *G06F 9/505* (2013.01); *G06F 9/5055* (2013.01); *G06F 9/5061* (2013.01); *G06F 9/5072* (2013.01); *G06F 9/5083* (2013.01)

(58) Field of Classification Search
CPC .... G06F 9/5027; G06F 9/5033; G06F 9/5038; G06F 9/5044; G06F 9/505; G06F 9/5055; G06F 9/5072; G06F 9/5083; G06F 9/5091
See application file for complete search history.

(56) References Cited

U.S. PATENT DOCUMENTS

| | | |
|---|---|---|
| 8,489,460 B2 | 7/2013 | Kamath |
| 8,719,415 B1 | 5/2014 | Sirota et al. |
| 8,924,981 B1 | 12/2014 | Brown et al. |
| 8,949,429 B1 | 2/2015 | Chuang et al. |
| 9,495,211 B1 | 11/2016 | Helstroom et al. |
| 9,852,011 B1 | 12/2017 | Yemini et al. |
| 2010/0131624 A1 | 5/2010 | Ferris |
| 2011/0029675 A1 | 2/2011 | Yeow et al. |
| 2011/0129223 A1 | 6/2011 | Yoo et al. |
| 2011/0161391 A1 | 6/2011 | Araujo et al. |
| 2011/0239010 A1 | 9/2011 | Jain et al. |
| 2012/0131591 A1 | 5/2012 | Moorthi et al. |
| 2012/0136989 A1 | 5/2012 | Ferris et al. |
| 2012/0137001 A1 | 5/2012 | Ferris et al. |
| 2012/0137003 A1 | 5/2012 | Ferris et al. |
| 2012/0198073 A1 | 8/2012 | Srikanth et al. |
| 2012/0278398 A1 | 11/2012 | Lowekamp |
| 2012/0331113 A1 | 12/2012 | Jain et al. |
| 2013/0124669 A1 | 5/2013 | Anderson et al. |
| 2013/0198050 A1 | 8/2013 | Shroff et al. |
| 2013/0205002 A1 | 8/2013 | Wang et al. |
| 2013/0290957 A1 | 10/2013 | Li et al. |
| 2013/0304923 A1 | 11/2013 | Clay et al. |
| 2013/0311662 A1 | 11/2013 | Stolyar |
| 2013/0346614 A1 | 12/2013 | Baughman et al. |
| 2014/0164624 A1 | 6/2014 | Ames et al. |
| 2014/0195673 A1 | 7/2014 | Cook et al. |
| 2014/0250232 A1 | 9/2014 | Liu et al. |
| 2014/0280441 A1 | 9/2014 | Jacobson et al. |
| 2014/0282573 A1 | 9/2014 | Clark et al. |
| 2014/0282582 A1 | 9/2014 | Clark et al. |
| 2014/0289412 A1 | 9/2014 | Doddavula et al. |
| 2014/0373010 A1 | 12/2014 | Folco et al. |
| 2015/0006733 A1 | 1/2015 | Khan et al. |
| 2015/0067171 A1 | 3/2015 | Yum et al. |
| 2015/0156082 A1 | 6/2015 | Kakadia et al. |

OTHER PUBLICATIONS

Emeakaroha et al, "SLA-Aware Application Deployment and Resource Allocation in Clouds", 2011 35th IEEE Annual Computer Software and Applications Conference Workshops, 2011, IEEE, pp. 298-303 (Year: 2011).

USPTO. Office Action relating to U.S. Appl. No. 17/44,609, dated Apr. 28, 2023.

ALLOCATING COMPUTING RESOURCES BASED ON USER INTENT

CROSS-REFERENCE TO RELATED APPLICATIONS

This U.S. Patent Applications is a continuation of, and claims priority under 35 U.S.C. § 120 from, U.S. patent application Ser. No. 17/444,609, filed on Aug. 6, 2021, which is a continuation of U.S. patent application Ser. No. 16/428,251, now U.S. Pat. No. 11,086,676, filed on May 31, 2019, which is a continuation of U.S. patent application Ser. No. 15/291,722, now U.S. Pat. No. 10,310,898, filed on Oct. 12, 2016, which application is a continuation of U.S. patent application Ser. No. 14/196,518, now U.S. Pat. No. 9,495,211, filed on Mar. 4, 2014. The disclosures of these prior applications are considered part of the disclosure of this application and are hereby incorporated by reference in their entireties.

TECHNICAL FIELD

This disclosure relates to allocating computing resources based on user intent.

BACKGROUND

Cloud computing and other distributed computing systems allow resource providers to offer computing resources for use by others over a network. For example, a resource provider may host a web-based application for a business, and enable use of the web-based application over the Internet. Some companies have organizational distributed computing systems in which employees or departments may be able to request and use computing resources of the distributed computing system.

Capacity planning for such computing systems can be a complex process that may require knowledge of resource supply, forecasted demand, and characteristics of the computing resources. Traditional resource planning approaches often involve individuals performing calculations to determine resource shortfalls, manually translating that shortfall into computing resources, and manually choosing locations to fulfill demand such that software services will meet their service level objectives. This can result in a system that is slow to adapt to changes, requires intensive manual labor, and potentially results in non-optimal solutions through human inefficiencies or errors.

SUMMARY

This specification describes technologies relating to allocating computing resources.

In general, one innovative aspect of the subject matter described in this specification can be implemented in methods that include the actions of receiving intent data specifying: one or more computing services to be hosted by a computing network; one or more requested characteristics of computing resources for use in hosting the computing service on the computing network; and for each requested characteristic, a priority value that indicates a priority of the requested characteristic relative to a priority of each other requested characteristic; identifying a budget constraint for each of the one or more computing services; identifying available resources data that specifies a set of available computing resources and, for each available computing resource: performance characteristics of the computing resource; pricing data for the available computing resource; and forecasted demand data for the available computing resource; generating a resource allocation problem for allocating computing resources for the one or more computing resources based on the received intent data, each budget constraint, and the available resources data; and allocating at least a portion of the set of computing resources for the one or more computing services based on results of evaluating the resource allocation problem to meet a particular resource allocation objective; and providing, for the one or more computing services, access to the allocated computing resources. Other implementations of this aspect include corresponding systems, apparatus, and computer programs, configured to perform the actions of the methods, encoded on computer storage devices.

These and other implementations can each optionally include one or more of the following features. In some implementations, the resource allocation problem includes one of a linear programming problem and a mixed integer programming problem.

Generating the resource allocation problem may include identifying, for each of the one or more computing services, one or more underlying computing services and one or more underlying computing resources that will be used to provide the computing service using a translation function for the computing service.

Generating a resource allocation problem may include generating a graph based on (a) the underlying computing services and the one or more underlying computing resources for each of the one or more computing services specified by the intent data and (b) the available resources data. The graph may include a node of each underlying computing service; a node for each underlying computing resource; and edges between two or more pairs of nodes, a particular edge between a particular pair of nodes representing a dependency of one a first node of the particular pair of nodes on a second node of the particular pair of node. The resource allocation problem may be generated based on the generated graph. The graph may include, for each edge, data identifying a requested characteristic of a relationship between a pair of nodes connected by the edge. The graph may include a directed acyclic graph. Allocating the at least a portion of the set of computing resources for the one or more services can include identifying a first allocation of computing resources based on results of solving the resource allocation problem to meet the particular objective; determining that the budget constraint is not satisfied by the first allocation; identifying a particular requested characteristic for removal from the resource allocation problem based on the priority value for the particular requested characteristic; removing the particular requested characteristic from the resource allocation problem to generate an resource allocation problem; and identifying a second allocation of computing resources based on results of solving the adjusted resource allocation problem to meet the particular resource allocation objective.

Allocating the at least a portion of the setoff computing resources for the one or more services can include identifying a first allocation of computing resources based on results of solving the resource allocation problem to meet the particular objective; determining that a cluster of computing resources is over-allocated based on the first allocation of computing resources; increase a price of at least one computing resource of the cluster in the resource allocation problem to generate an adjusted resource allocation problem; and identifying a second allocation of computing resources based on results of solving the adjusted resource allocation problem to meet the particular resource allocation objective. The particular resource allocation objective may include reducing a total cost for implementing the one or more services.

Particular implementations of the subject matter described in this specification can be implemented so as to realize one or more of the following advantages. Finite amounts of computing resources can be allocated more efficiently and more effectively using linear programming and/or mixed integer programming techniques than using a manual process to allocate the resources. Resource allocation processes can be faster, more flexible and better adapt to changes using an automated process rather than a manual process. Labor costs and human error can also be reduced using an automated process to allocate resources. By allocating resources based on priority, users can view requested characteristics of computing resources that were not able to be met due to constraints that may be budgetary or resource characteristic related.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
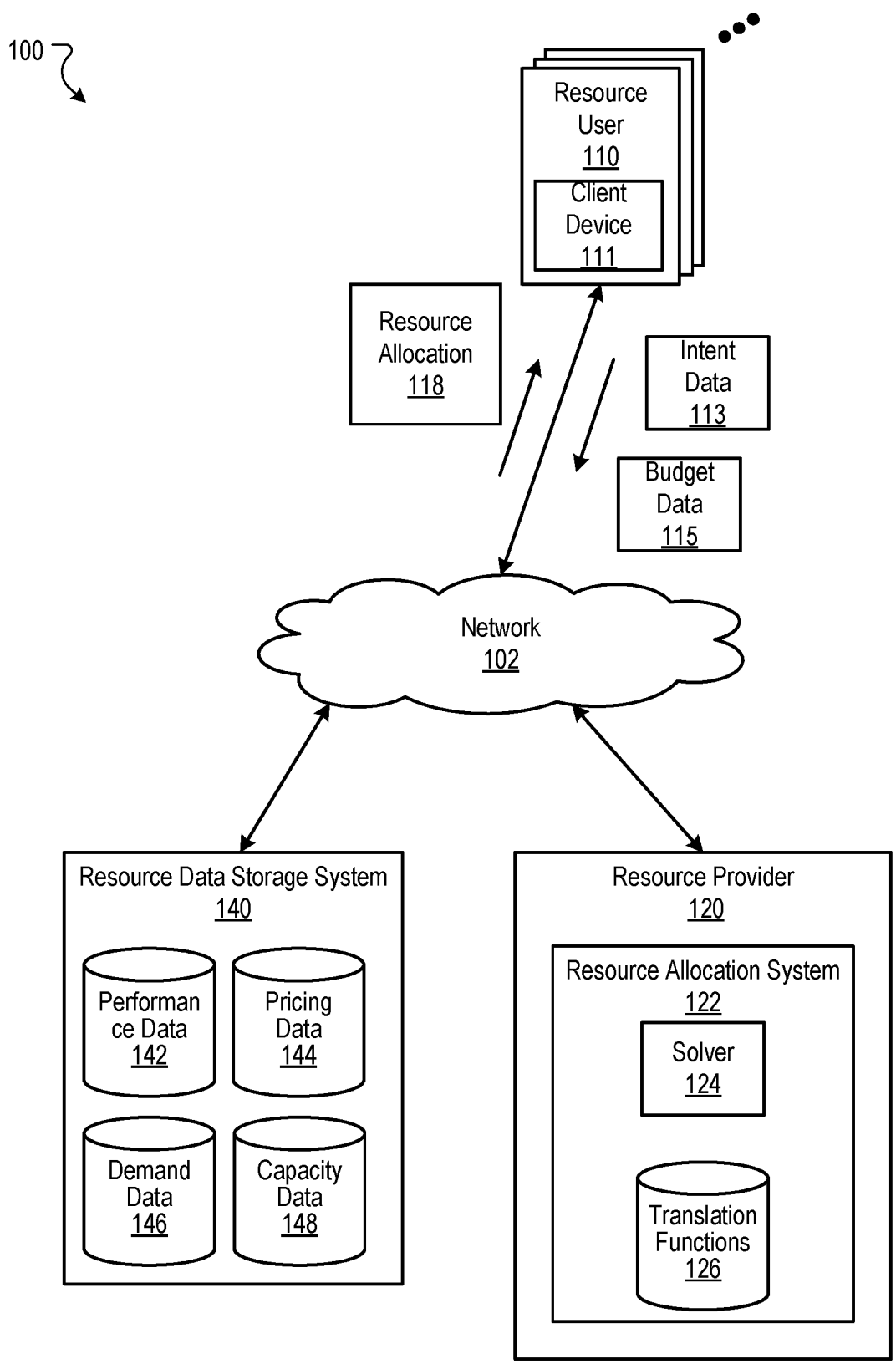
FIG. 1 is a block diagram of an environment in which a resource allocation system allocates computing resources.

A system can allocate underlying computing resources, e.g., processors, memory, networking components, software applications, and/or sophisticated security systems, for use by a computing service based on user intent data that specifies requested characteristics for computing resources used to implement or provide the computing service. A user, such as a cloud computing customer, can request resources for use in hosting one or more computing services. For example, the user may request computing resources to host an application that requires a multitude of servers, a data processing application, and data storage. The user may also request that the underlying computing resources have certain characteristics, such as a particular level of redundancy or for a particular resource to be within a certain distance or data transmission time of another resource.

As the system may not be able to provision resources which fulfill all of the requested characteristics, for example, due to a budget constraint for the computing service(s), the user may specify, as part of the intent data, a priority for each of the requested characteristics. In some implementations, the user may specify a relative priority value for each requested characteristic. For example, a stacked priority may be used such that the highest priority characteristic is assigned a priority value of 1, the next highest priority characteristic is assigned a 2, and so on.

The system can identify and allocate available computing resources for use in hosting a particular computing service based on the intent data, data regarding available resources, a budget constraint for the particular computing service, forecasted demand for the available resources, and/or a resource allocation objective (e.g., minimize the cost of the underlying resources). In some implementations, the system may generate a programming problem, such as a linear programming problem or a mixed integer programming problem, based on the data and resource allocation objective. The system may then solve the problem to determine a resource allocation that meets the resource allocation objective and satisfies as many requested characteristics as possible given a budget constraint and/or other constraints.

These features and other features are described in more detail below. Although the description that follows is largely in terms of allocating computing resources, the systems and processes described below can be used to allocate other types of resources. For example, the system can be used to allocate desks, offices, cubicles, and other office space elements. To illustrate, each group within an organization may provide intent data that specifies its office space needs and requested characteristics (e.g., Group A needs 70 desks and wants to set near Group B, which needs 30 desks and would like to be located near north-facing windows). In addition, Group C may specify that it was moved two months ago and can only be moved once per year. The system can generate a resource allocation programming problem (e.g., a linear or mixed integer programming problem) based on the intent data, data regarding available office space, and an objective (e.g., keep each group together, minimize wasted space, etc.). The system can then solve the problem to allocate the office space resources to the groups. The system can also be used to bin pack many other types of resources.

FIG. 1 is a block diagram of an example environment 100 in which a resource allocation system allocates 122 computing resources. A resource provider 120, may provide access to computing resources and computing services to resource users 110 by way of a network 102. The network 102, which can include a local area network (LAN), wide area network (WAN), the Internet, or a combination thereof, connects the resource provider 120 (and its computing resources) with client devices 111 of the resource users 110.

The resource provider 120 can provide the use of computing resources, such as servers, processors, data storage, virtual machines, and software applications by way of the network 102. In some implementations, the resource provider 120 is an Information Technology ("IT") group (e.g., within a company or external IT provider) that makes computing resources available to individuals or groups within an organization by way of an Intranet, WAN, or other type of network. The resource provider 120 may also be a cloud provider or third party broker that allocates computing resources from one or multiple cloud computing providers. For example, the resource user 110 may be a cloud customer that requests and uses cloud computing resources made available by one or more cloud providers over a cloud computing service that includes the network 102.

A resource user 110, e.g., individuals, departments, product groups, and/or organizations that use cloud computing resources, can request computing resources by generating intent data 113 and sending the intent data to the resource provider 120. The intent data 113 may identify one or more computing services that the resource user 110 would like to have hosted by the resource provider 120. The intent data 113 may also specify one or more requested characteristics for computing resources that are used to host the computing service. The requested characteristics can relate to the performance of the resource, the quantity of the resource, the type of resource, an amount of redundancy for the resource, the location for one or more instances of the resource, security for the resource, or another appropriate resource characteristic. For example, the computing service may be a video sharing web site that requires a multitude of servers, back-end applications, front-end applications, data storage, and other computing resources. Some requested characteristics for the video sharing web site may include several locations for instances of the front-end application, a maximum data transmission time between each front-end application and a corresponding back-end application, and a minimum amount of redundant storage.

The intent data 113 may also specify a priority for each requested characteristic. The priority may be specified using relative priority values, such as stacked priorities. Continuing the video sharing web site example, a stacked priority may indicate that the locations for the instances of the front-end applications has the highest priority with a value of 1; that the maximum transmission time has a priority value of 2; and that the minimum amount of redundant storage has a priority value of 3, representing the lowest priority of the three requested characteristics. In some implementations, two or more characteristics may have the same priority value. For example, there may be two high priority characteristics assigned a priority value of 1 and some lower priority characteristics assigned a priority value of 2.

The intent data may also specify one or more characteristics that are required for the computing service. For example, the resource user 110 may not want to host an application unless the resource provider 120 can provide a particular level of redundancy for the application. The resource user 110 can specify, in the intent data 113, that the redundancy is an absolute requirement that must be fulfilled for any computing resources to be allocated for the application.

In some cases, a resource user 110 may prefer a certain characteristic, but be willing to settle for a resource that does not quite meet the preferred characteristic. The resource user 110 can use priority values for the characteristic to define this intent. For example, the resource user 110 may prefer that a server be located in California, but is also willing to use a server in Oregon or Washington. In such an example, the resource user 110 may specify a requested characteristic that the server be located in California with a priority value of 1. The resource user 110 may also specify a requested characteristic that the server be located in Oregon with a priority value of 2, and Washington with a priority value of 3.

In some implementations, the resource provider 120 may enable resource users 110 to specify their intent in a way that is human understandable and machine readable. For example, the resource provider 120 may provide a language with a particular syntax in which resource users 110 can specify computing services, priorities, and requested characteristics in a human and machine readable format. The syntax can be parsed by systems of the resource provider 120 to identify the intent of the resource user 110. For example, the language may allow the resource user to identify a particular computer resource by name and also specify a requested characteristic by name and/or type. To illustrate, the language may be in the form of "requirement1=requested_characteristic(serviceA, N+1 redundancy)", where "requirement1" is the name of the requirement, "requested_characteristico" provides a field for the resource user 110 to enter the requested characteristic and computing service upon which the requirement is to be applied. In this example, "serviceA" is the name of the resource user 110 and "N+1 redundancy" is the requested characteristic.

The resource user 110 can also provide budget data 115 to the resource provider 120 by way of the network 102. The budget data 115 may specify a budget constraint for each cloud service of the intent data 113 and/or an overall budget constraint for all of the cloud services requested by the resource user 110. The budget constraint for one or more cloud services can specify a maximum amount that the resource user can spend to have the computing service(s) hosted, e.g., in dollars or credits.

The resource provider 120 includes a resource allocation system 122 that allocates computing resources of the resource provider 120 for use in hosting computing services for resource users, such as the resource user 110. The resource provider 120 can allocate available computing resources based on the intent data 113 and budget data 115 received from the resource users 110. The resource allocation system 120 can also consider data regarding the available computing resources, for example, stored in the resource data storage system 140.

The resource data storage system 140 includes a performance data store 142, a pricing data store 144, a demand data store 146, and a capacity data store 148. Although each data store 142-148 is illustrated as a separate data store, the data of each data store 142-148 can be stored together or separately. For example, each type of data for a particular computing resource may be stored together.

The performance data store 142 stores data related to performance characteristics for computing resources of the resource provider 120. The performance data may vary based on the type of computing resource. For example, the performance data for a processor may be related to processing speed, while the performance data for a network router may be related to throughput.

The pricing data store 144 stores pricing data for the computing resources of the resource provider 120. The pricing data for a particular computing resource may specify the price that a resource user may be required to pay for use of the generic underlying computing resource, or for higher-level infrastructure, such as a cache server, which would automatically be computed from the prices of the underlying components. The pricing data for a resource may be in terms of the number of instances of the resource, the amount of time that the resource is used, and/or the amount of data processed by the resource. For example, the pricing data for a particular front-end application may be based on a number of requests processed by the application, while the pricing data for a server may be based on the number of servers used and the amount of time that each server is used.

The pricing data may be specific to particular computing resources or particular clusters of resources. For example, the price of a computing resource may vary based on the geographic region (e.g., based on the price of electricity in the geographic region) in which the resource is located. If a resource user 110 wants a resource in a higher priced area, a higher price may be charged for use of that resource than the use of the same resource in a lower priced area.

The demand data 146 stores demand data, such as forecasted demand data, for the computing resources of the resource provider 120. The demand data for a particular computing resource may indicate how many of the resources may be needed in the future and/or how often the resource is expected to be utilized in the future. The demand data may be based on intent data 113 received from resource users 110 and/or based on other sources of use for the resources. As described in more detail below, some computing resources rely on additional computing resources and increases in demand for the former may result in increased demand for computing resources for the latter. For example, a back-end application may rely on servers, data storage, and/or networking devices. Thus, the demand of the back-end application may affect the demand for servers, data storage devices, and networking devices used by the back-end application.

Demand data may also be stored or obtained for the computing service(s). For example, the resource user 110 may specify a forecasted demand for the computing service. The forecasted demand may change, for example, based on the addition of a new feature or based on increased marketing. By way of another example, the demand may be forecasted by the resource allocation system 120 based on trends for the computer services.

In some implementations, the forecasted demand data may be in the form of growth for the computing service, rather than in the form of trending resources consumed. For example, the forecasted demand for a front-end server may be in the form of requests per second rather than processor seconds used. This demand signal reflects the true intent of the demand that must be served and abstracts the demand signal from the computing resources that are actually used to fulfill it. In this way, the mix of platforms that may be available in production does not affect the demand signal. This also allows for inorganic changes to be more accurately captured. For example, a new feature may be forecasted to result in a 10% increase in demand. Thus, the demand signal may be a 10% increase over prior demand rather than a hardware-based demand signal that is based on the 10% increase.

The capacity data store 148 stores capacity data for each computing resource and/or each cluster of computing resources. The capacity data can take one or more forms. For example, the capacity data can be capacity that is already configured for a computing service in a particular location. The capacity data can also be unused machine resources available to a computing service from another resource user, or future options on space and computing power that have been acquired but not yet executed.

To allocate the available computing resources to the resource user(s) 110, the resource allocation system 122 may obtain the intent data 113, the budget data 115, and available resources data that identify the available resources of the resource provider 120 and the performance, pricing, demand, and capacity data for the computing resources. Other characteristics of the available computing resources can also be obtained. In some implementations, the resource allocation system 122 generates a resource allocation programming problem using the obtained data and solves the problem to meet a particular resource allocation objective. For example, the resource allocation objective may be to host the computing service(s) specified by the intent data 113 at a low cost or to maximize the number of requested characteristics fulfilled for the computing service(s).

The resource allocation programming problem may be a linear programming problem or a mixed integer programming problem that can be evaluated to determine a resource allocation that meets the resource allocation objective within certain constraints, such as the budget constraint(s) and constraints related to the requested characteristics and/or the available computing resources. For example, the resource allocation programming problem may include the resource allocation objective and a set of constraints based on the intent data 113, the budget constraint data 115, and data regarding the available computing resources. As described in more detail below, a solver 124 of the resource allocation system 122 can generate the resource allocation programming problem and evaluate the problem to identify a resource allocation that meets the resource allocation objective and the constraints of the problem.

The solver 124 may be a computer or other data processing apparatus that executes a program or algorithm for evaluating or solving linear programming problems and/or mixed integer problems. For example, the solver 124 may execute an algorithm based on a resource allocation programming problem to determine a resource allocation that satisfies or optimizes a resource allocation objective subject to constraints of the resource allocation programming problem.

The resource allocation system 122 also includes translation functions 126 for computing services and computing resources. A translation function for a computing service or resource can be used to identify underlying resources that can be used to implement or provide the resource or service. For example, a translation function for a computing service or resource may specify one or more underlying resources that can be used to provide an instance or a unit of the computing service or resource. The translation function for a redundant storage system may specify, for example, a particular amount of raw data storage for each gigabyte (GB) of storage requested and for each level of redundancy (e.g., N+1, N+2, and so on).

The translation functions can also be nested as some computing resources that are used to provide a computing service may also rely on underlying resources. For example, an application may require servers and redundant storage. The translation function for the application may specify a number of servers that are required for the application and an amount of data storage required for the application. Intent data for the application may also specify N+2 redundancy. The translation function for the application can be used to identify the number of servers and the amount of redundant data storage required for the application. A translation function for the redundant data storage can be used along with the amount of storage identified using the translation function for the application and the level of redundancy specified by the intent data to determine the amount of raw data storage required for the application.

The translation functions can also be used to predict the demand that a computing service is going to place on a computing resource. The translation function for a computing service may specify a particular quantity or capacity of a computing resource that may be required per unit demand of the computing service. For example, a translation function for a video sharing web site may specify that one front-end server is required for every X number of requests per day, where X is a particular number. Translation functions can be used similarly for predicting the demand that a particular computing resource will place on another computing resource.

The solver 124 can use the translation functions for a requested computing service and/or for the available computing resources to identify computing resources that can be used to provide the computing service. The solver 124 can then generate a resource allocation program problem based on the identified computing resources, requested characteristics for the computing service and their relative priority, the budget constraint for the computing service, and/or data regarding available computing resources. The solver 124 can then evaluate the resource allocation programming problem to identify an allocation of available computing resources that meet a resource allocation objective and, preferably, at least some of the requested characteristics. The resource provider 120 can then provide resource allocation data 118 specifying the resource allocation to the resource user 110 and/or host the computing service for the resource user 110.

Figure 2:
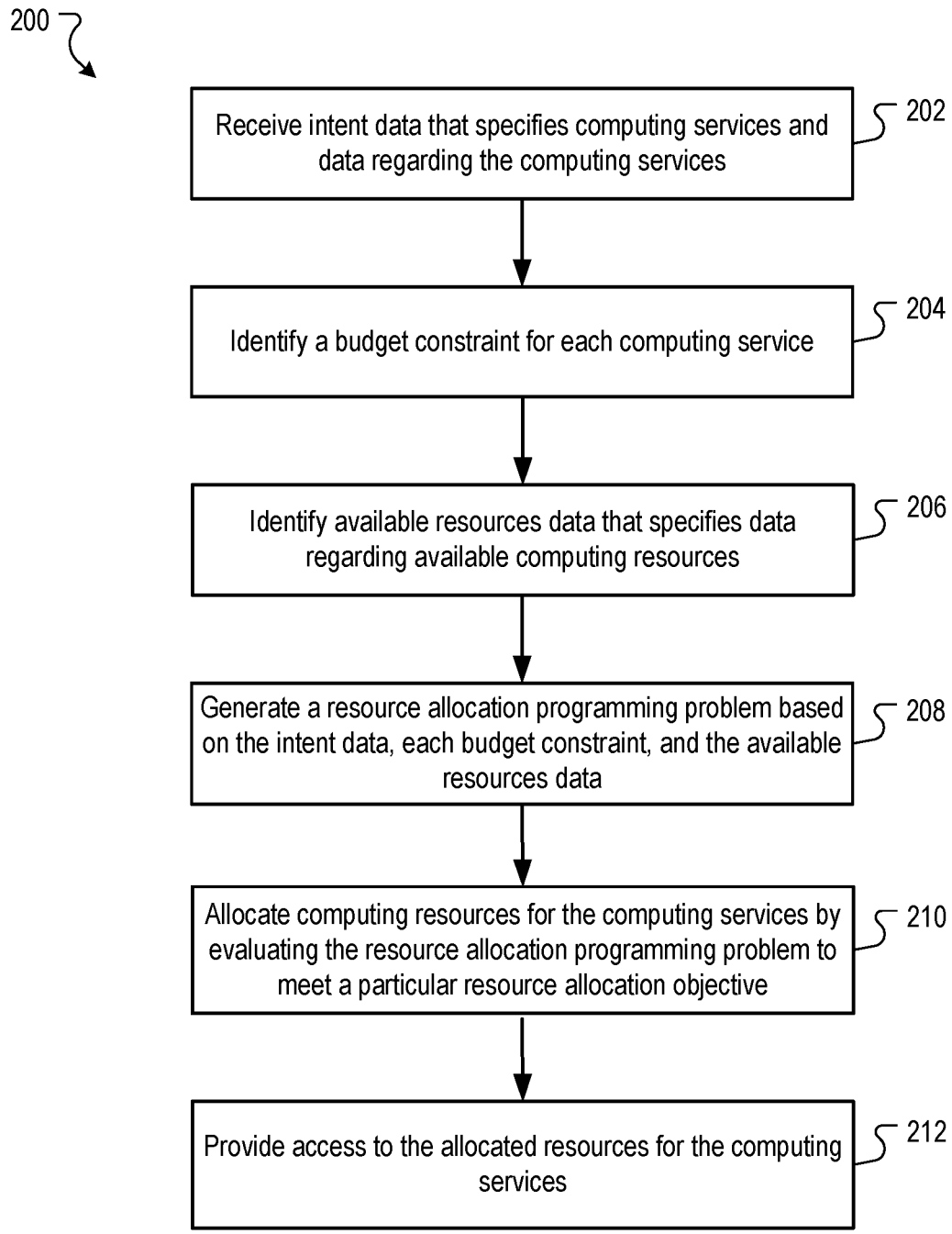
FIG. 2 is a flow chart of an example process for allocating computing resources and providing access to the allocated resources.

FIG. 2 is a flow chart of an example process 200 for allocating computing resources and providing access to the allocated resources. Operations of the process 200 can be implemented, for example, by a data processing apparatus, such as the resource allocation system 120 of FIG. 1. The process 200 can also be implemented by instructions stored on computer storage medium, where execution of the instructions by a data processing apparatus causes the data processing apparatus to perform the operations of the process 200.

At block 202, intent data is received. For example, a resource user 110 may specify the intent data 113 using a client device 111 and submit the intent data 113 to a resource provider 120. The intent data 113 may specify one or more computing services that the resource user 110 would like to have hosted by computing resources of the resource provider 120. For example, the intent data may specify a video sharing web site and/or an image sharing web site, both operated by the resource user 110, which the resource user 110 would like to have hosted by the resource provider 120. The intent data 113 may also specify a time or time period in which the resource user 110 would like the computing service(s) to be hosted.

The intent data may also specify requested characteristics of each computing service. The requested characteristics can be related to characteristics of underlying computing resources that are used to implement or provide the computing service and/or relationships between the underlying computing resources. For example, a requested characteristic for a data storage system may be a minimum amount of redundancy. Another example of requested characteristic of the data storage system may be that the data be stored within 50 milliseconds (ms) in terms of data transmission time of a back-end application.

As described above, each requested characteristic can also have an associated priority. For example, the resource user 110 may assign a priority value to each of the requested characteristics. The priority values may be stacked, indicating a relative priority between the requested characteristics. For example, the highest priority characteristic may be on top of the stack, or have a priority value of 1. The lowest priority characteristic may be on the bottom of the stack, or have a low priority value (e.g., a value of 3 if there are three requested characteristics).

If the intent data specifies multiple computing services within a single user or organization's purview, each of the computing services may also be assigned a priority relative to the other computing services. Continuing the web site example, the video sharing web site may be assigned a higher priority than the image sharing web site, or vice versa.

At block 204, a budget constraint is identified for each computing service and/or for a combination of the computing services specified in the intent data 113. As described above, the budget constraint for one or more cloud services can specify a maximum amount that the resource user can spend to have the computing service(s) hosted. The budget constraint can be provided by the resource user 110 in budget data 115 or with the intent data 113.

At block 206, available resources data are identified. For example, the resource allocation system 122 may retrieve the available resources data from the resource data storage system 140. The available resources data can specify computing resources that may be used to host the computing service(s) specified in the intent data 113. For example, the available resources data may specify computing resources that are available at the time or during the time period specified by the intent data 113. The available resources data may also specify characteristics of each available computing resource, such as pricing data, performance data, demand data, location data specifying the location of the resource, and other appropriate characteristics of the resource.

At block 208, a resource allocation problem is generated based on the intent data, the budget constraint(s), and the available resources data. For example, the solver 124 may generate the resource allocation problem based on the data. In some implementations, the resource allocation problem is a linear programming problem, mixed integer programming problem, or another appropriate type of model that can be evaluated or solved to satisfy an objective. The resource allocation programming problem can include a resource allocation objective and one or more constraints, for example that are based on the intent data, budget constraint(s), and the available resources data.

The resource allocation objective can include an objective function that is maximized or minimized subject to the one or more constraints. For example, the resource allocation objective may be to minimize the total cost for hosting the computing service(s) using computing resources of the resource provider 120 or to fulfill as many of the requested characteristics specified by the intent data 113 while meeting the budget constraint.

The one or more constraints can be generated based on the intent data, the budget constraint, and the available resources data. A constraint based on a budget may specify that the total cost of underlying computing resources selected to host the computing service be less than or equal to the budget.

Constraints based on the intent data 113 can include constraints based on the specified computing service(s), the requested characteristics of the computing resources, the priority values for the requested characteristics, and/or priority values that specify the relative priority between two or more computing services. In some implementations, the solver 124 uses the translation functions 126 to identify underlying computing resources that can be used to provide the computing service and relationships between the computing resources. Constraints can be generated based on the underlying resources. For example, a constraint may specify that ten servers are needed to host a computing service. Another constraint may specify that five data storage units are required for a redundant data storage system that is, in turn, required for a computing service.

A constraint for a requested characteristic may specify the requested characteristic and/or its priority. For example, the intent data 113 may specify a highest priority requested characteristic of a front-end application to be hosted in Texas and a second highest priority requested characteristic of N+2 redundancy for a data storage system. A series of constraints may include a first constraint that specifies that the front-end application be hosted in a cluster of resources or a datacenter located in Texas; and a second constraint that specifies that the N+2 redundancy be fulfilled if the first constraint can be fulfilled while also fulfilling the redundancy constraint. Returning to the web site example, the user may designate that a 50 ms data transmission latency requirement for the video sharing web site is a higher priority than a N+1 redundant capacity for the image sharing web site. Alternatively, the video sharing web site may rank N+1 redundancy as its highest priority, with N+1 redundancy as less important, but still a desired requirement. Requirements (or requested characteristics) of a different nature can be mixed and matched as per the needs of the service owner. This becomes particularly useful when planning for additional capacity for new feature launches. For example, a user may specify that resources for the new feature are only to be provisioned if there is additional budget remaining once requirements that sustain baseline business operations are met.

Constraints can also be generated based on the demand data for the available computing resources and/or capacity data for the computing resources. An example constraint may specify that the total storage assigned to a data storage device cannot exceed a particular amount of storage. Another example constraint may specify that a front-end application can only be assigned a particular amount of requests per day.

The resource allocation programming problem can also include parameters that are used to solve the problem based on the available resources data and the budget. For example, the pricing data and the performance data for the computing resources can be used as parameters to determine which computing resources can be used to host the computing service such that the constraints are satisfied and the resource allocation objective is satisfied.

At block 210, computing resources are allocated for use in hosting the computing service(s) by evaluating the resource allocation programming problem. For example, the solver 124 may iteratively plug parameters into variables of the programming problem and evaluate the results to identify an allocation that satisfies the resource allocation objective, subject to the one or more constraints.

At block 212, access to the allocated resources is provided. For example, the resource user 110 may provide resource allocation data 118 to the resource user 110 to inform the resource user 110 of the computing resources that have been allocated to the resource user 110. The resource allocation data 118 may also identify the requested characteristics that are fulfilled by the allocation and/or the requested characteristics that were not fulfilled by the allocation.

In addition, the resource allocation system 120 may identify suggested changes to the resource user's intent that would allow the resource user 110 to receive more of the requested characteristics. For example, the resource allocation system 120 may determine an amount of increase in the budget that would allow the resource user 110 to receive each requested characteristic that was not fulfilled. In this way, the resource user 110 can better understand the effect of its budget and priorities and optionally adjust the budget to receive additional requested characteristics. For example, the resource user 110 may increase its budget and request that the resource provider 120 determine a new allocation based on the increased budget. After the computing resources have been allocated, the resource provider 120 may host the computing service(s) using the allocated resources.

Figure 3:
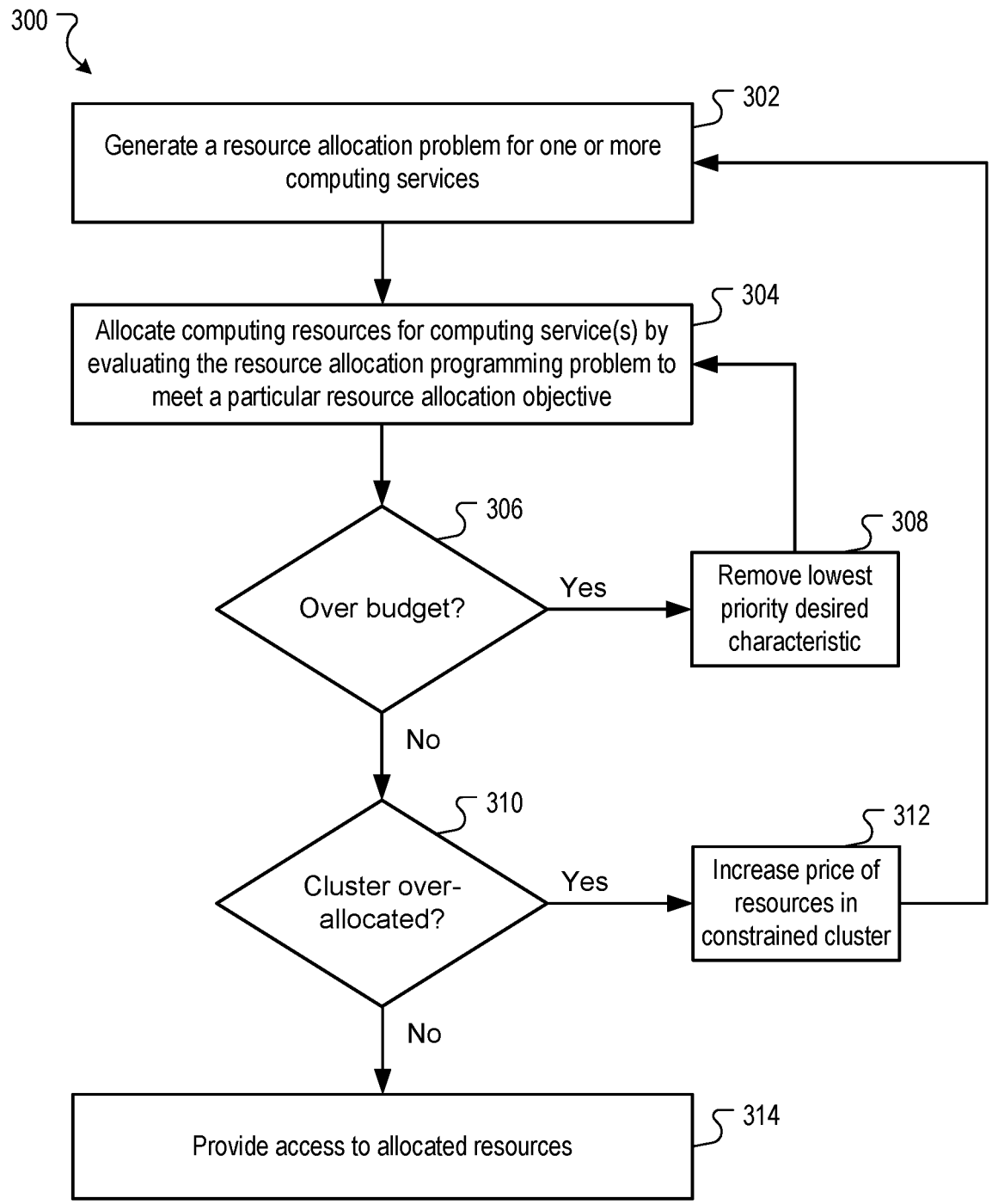
FIG. 3 is a flow chart of another example process for allocating computing resources and providing access to the allocated resources.

FIG. 3 is a flow chart of another example process 300 for allocating computing resources and providing access to the allocated resources. The example process 300 includes a deconfliction technique that makes adjustments to the resource allocation programming problem to meet certain constraints. Operations of the process 300 can be implemented, for example, by a data processing apparatus, such as the resource allocation system 120 of FIG. 1. The process 300 can also be implemented by instructions stored on computer storage medium, where execution of the instructions by a data processing apparatus causes the data processing apparatus to perform the operations of the process 300.

At block 302, a resource allocation programming problem is generated for one or more computing services. For example, the resource allocation programming problem may be generated based on intent data, budget constraint(s), and available resources data, as described above with reference to block 208 of FIG. 2.

At block, 304, computing resources are allocated for the computing service(s) by evaluating the resource allocation programming problem to meet a particular resource allocation objective. For example, the particular resource allocation objective may be to minimize the cost for computing resources that host the computing service or to maximize the number of requested characteristics fulfilled. The resource allocation programming problem may be evaluated by the solver 124, as described above with reference to block 210 of FIG. 3.

At block 306, a determination is made whether the resource allocation results in a total cost that exceeds the budget constraint. For example, the solver 124 may compare the total cost for the allocated resources to the budget constraint to determine whether the budget is exceeded.

At block 308, if the cost for the allocated resources exceeds the budget, a requested characteristic may be removed from the resource allocation programming problem. For example, the solver may adjust the resource allocation programming problem by removing the lowest priority requested characteristic from the resource allocation programming problem. After adjusting the resource allocation programming problem, the solver 124 can evaluate the adjusted resource allocation programming problem to identify an updated resource allocation and repeat this process until the resource allocation satisfies the budget constraint.

At block 310, a determination is made whether a cluster of computing resources (or an individual computing resource) is over-allocated. For example, the solver 124 may compare the available capacity of each cluster to the amount of demand being assigned to the cluster due to the resource allocation. If the demand exceeds the capacity, the cluster may be considered to be over-allocated.

At block 312, if a cluster is over-allocated, the price for the cluster or the price of computing resources in the cluster may be increased. For example, the solver 312 may increase price parameters for the cluster or its resources in the resource allocation programming problem. In this way, the solver 124 may identify a different cluster of resources for allocation to the computing service. After increasing the price parameters, the solver 124 can evaluate the adjusted resource allocation programming problem to identify an updated resource allocation and repeat this process until the resource allocation does not result in the over-allocation of a cluster or computing resource.

At block 314, if the resource allocation meets the budget constraint and does not over-allocate a cluster or individual computing resource, access to the allocated resources may be provided to the resource user 110 to host the computing service. In addition, resource allocation data 113 may be provided to the resource user 110.

In some implementations, a graph may be generated and used to create a resource allocation programming problem. The graph is defined by relationships between the computing service and computing resources that can be used to host the service and/or relationships between the computing resources. For example, the graph may be based on the dependencies between computing resources and the resulting demand caused by the dependency. In addition, the graph may be based on the intent of the resource user by illustrating requested characteristics of the computing resources used to host the computing service.

Figure 4:
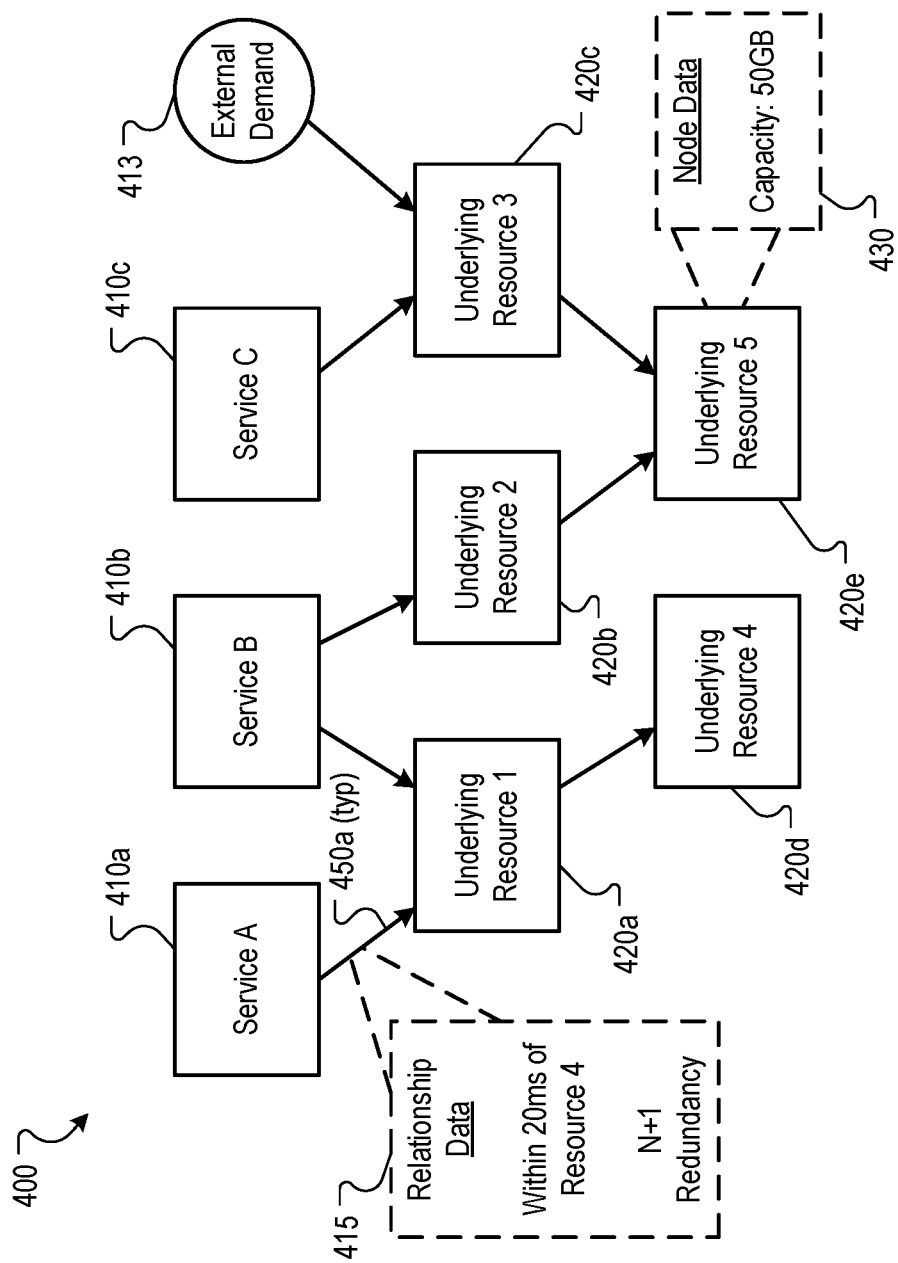
FIG. 4 depicts a graph of relationships between computing services and resources.

FIG. 4 depicts a graph 400 of relationships between computing services and resources. The graph 400 may be, for example, a directed acyclic graph. The example graph includes three computing services 410a-410b that may be specified in intent data received from a resource user 110. Each computing service 410-410c can be implemented or provided using one or more underlying computing resources. For example, the computing service 410a can be implemented using computer resource 420a; computing service 410b may be implemented using computing service 420a and 420b; and computing service 410c may be implemented using computing resource 420c.

The computing resources 420a-420c also rely on other resources for their implementation. For example, computing resource 420a may be implemented using underlying computer resource 420d, and the computing resources 420b and 420c may be implemented using underlying computer resource 420e.

In the graph 400, the computing resources 420a-420e may represent types of computing resources rather than actual available resources. For example, the computing resource 420a may represent a redundant data storage system that may be implemented in several locations, rather than representing one of the actual data storage systems.

In the graph 400, the computing services 410a-410c and the computing resources may be represented by nodes. Each node can be associated with data regarding the computing service or computing resource of the node. For example, a node for a computing resource may be associated with node data that specifies pricing data, performance data, available capacity data, and/or demand data. In the graph 400, the node for the computing resource 420e is associated with node data 430 that specifies that the computing resource 420e has a capacity of 50 GB. Node data for a computing service may include data specifying a budget constraint for the computing service.

Edges 450 may be used to connect related nodes in the graph 400. For example, an edge 450 connects the computing service 410a to its underlying computing resource 420a. The graph 400 can also include, for each edge 450, relationship data 415 that describes the relationship between the two nodes connected by the edge 450. For example, the edge 450 that connects the computing service 410 with the computing resource 420 includes two requested characteristics for the computing resource 420a. These two requested characteristics specify that the computing resource 420a be within 20 ms of computing resource 420d and that the computing resource 420a have N+1 redundancy. Other characteristics of the relationship between the two nodes, can also be included in the relationship data 415, such as location data, performance data, priority for requested characteristics, and so on.

The relationship data 415 for two nodes can also specify a forecasted demand for that a computing resource or service places on a computing resource. For example, the relationship data 415 for the computing service 410a and computing resource 420a could specify the forecasted demand that the computing service 410 will place on the computing resource 420a. In turn, relationship data for the computing resource 420a and the computing resource 420d may specify the forecasted demand that the computing resource 420a will place on the computing resource 420d. In this manner, downstream computing resources (e.g., underlying computing resources that are relied upon by upstream resources) inherit demand from upstream forecasts.

Other demand signals can also be included in the graph 400 as one or more of the computing resources may be demanded by other services or resources that are not specified by the intent data received from a resource user. For example, a back-end system of the resource user 110 may use some capacity of a resource, such as a rack of servers. In the graph 400, the computing resource 420c has an external demand signal 413 that specifies external demand on the computing resource 413.

The graph 400 can be generated based on intent data specifying the computing services 410a-410c and requested characteristics for the computing resources used to implement or provide the computing services 410a-410c. Translation functions, such as translation functions 126, can be used to identify the computing resources 420a-420e. For example, translation functions for the computing services may be used to identify the computing resources 420a-420c. In addition, translation functions for the computing resources 420a-420c may be used to identify the computing resources 420d-420e. After the graph is generated, the graph 400 can be used to generate a resource allocation programming problem for use in allocating resources to the resource user 110.

Figure 5:
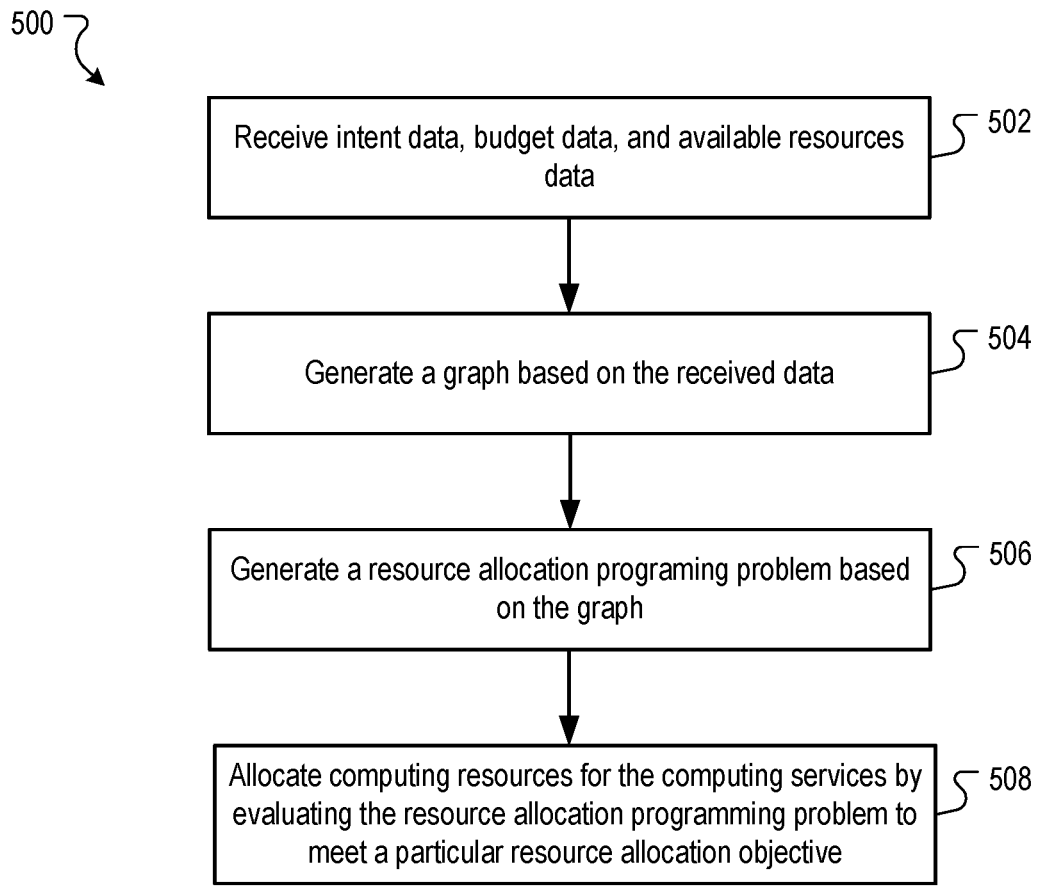
FIG. 5 is a flow chart of an example process for allocating computing resources.

FIG. 5 is a flow chart of an example process 500 for allocating computing resources using a graph that defines relationships between computing services and computing resources, such as the graph 500. Operations of the process 500 can be implemented, for example, by a data processing apparatus, such as the resource allocation system 120 of FIG. 1. The process 500 can also be implemented by instructions stored on computer storage medium, where execution of the instructions by a data processing apparatus causes the data processing apparatus to perform the operations of the process 500.

At block 502, intent data, budget data, and available resources data are received. For example, the data may be received by the resource allocation system 122. The intent data may specify one or more computing services, requested characteristics for computing resources used to implement or provide the one or more computing services; and priorities for the requested characteristics and/or the one or more computing services. The budget data may specify budget constraints for each of the one or more computing services or a total budget constraint for the one or more computing services. The available resources data may specify available computing resources and characteristics of the available computing resources (e.g., performance, pricing, capacity, and/or demand data).

At block 504, a graph is generated based on the received data. For example, the resource allocation system 122 may generate a directed acyclic graph that defines relationships between the computing services and underlying computing resources using the received data. To generate the graph, the resource allocation system 122 may use translation functions to identify underlying computing resources for each computing service. The resource allocation system 122 may also use the translation functions to predict the demand that the computing service will place on each underlying computing resource.

Nodes can be created for each computing service and for each computing resource. Each node can be associated with data regarding the computing service or computing resource of the node. For example, a node for a computing resource may be associated within pricing data, performance data, available capacity data, and/or demand data.

In addition, an edge can be added to the graph to connect a node with a related node. For example, a respective edge may be added to connect a computing service to each underlying computing resource that can be used to implement or provide the computing service.

Relationship data can be associated with an edge. The relationship data for an edge can specify characteristics between the two nodes connected by the edge. For example, the relationship data for an edge that connects a computing service to a computing resource may include requested characteristics of the computing resource, forecasted demand data that the computing service imposes on the computing resource, and other appropriate data. If one or more of the computing resources is demanded by a computing resource or service that is not included in the graph, then a node may be added to the graph that defines the demand placed on that computing resource.

At block 506, a resource allocation programming problem is generated based on the graph. For example, the solver 124 may generate the resource allocation programming problem based on the node data and relationship data of the graph. The data from the graph can be used to define constraints for the resource allocation programming problem and parameters for the resource allocation programming problem. For example, the relationship data for an edge may include requested characteristics for a computing resource connected to the edge. Constraints can be generated for requested characteristics, as described above. Constraints can also be generated based on capacity data for computing resources, budget constraints for the computing services, and other appropriate data.

Depending on the nature of the constraints, a linear or mixed integer programming problem may be formed from the resultant relationship of nodes in the graph, as defined by edges in the graph. For example, the capacity of resource 420e of FIG. 4 must be strictly greater than or equal to the sum of demand of resource 420e as defined by the nodes 420b and 420c. Similar inequalities can be derived from other nodes in the graph. Inequalities can result in the generation of a linear programming problem. Constraints that are non-linear in nature, such as minimum number of computing resources preferred in a single pool of available resources, can result in the generation of a mixed integer programming problem.

In block 508, the resource allocation programming problem is evaluated to allocate computing resources for the computing services such that a resource allocation objective is satisfied subject to the constraints of the resource allocation programming problem. For example, the solver 124 may evaluate the resource allocation programming problem, as described above with reference to FIGS. 2 and 3.

Figure 6:
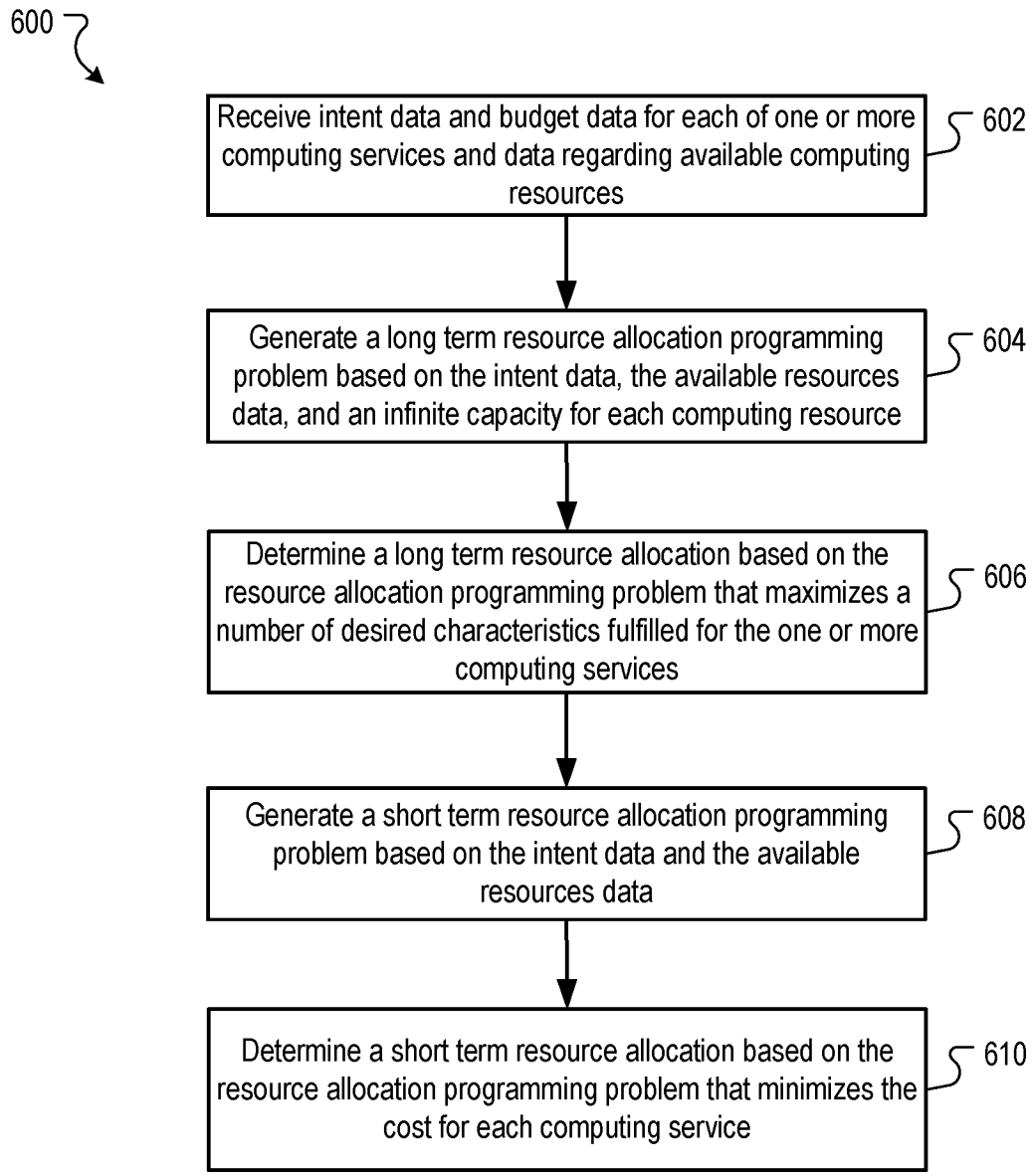
FIG. 6 is a flow chart of another example process for allocating computing resources.

FIG. 6 is a flow chart of another example process 600 for allocating computing resources. The example process 600 conducts a long term resource allocation and then conducts a short term resource allocation when it is closer to the time in which the computing service will actually be hosted. For example, the long term resource allocation may be conducted to plan for the amount of resources that may be needed in the future. This allocation may be used, for example, to buy additional resources if needed. When it is closer to the time for the computing service to be hosted, the resource allocation can be conducted again to identify an efficient resource allocation given the resources at that time and, for example, updated demand forecasts. For example, the long term resource allocation may be conducted a year before the computing service will be hosted by the resource provider 120 and the short term resource allocation may be conducted one month before the computing service will be hosted by the resource provider 120.

Operations of the process 600 can be implemented, for example, by a data processing apparatus, such as the resource allocation system 120 of FIG. 1. The process 600 can also be implemented by instructions stored on computer storage medium, where execution of the instructions by a data processing apparatus causes the data processing apparatus to perform the operations of the process 600.

At block 602, intent data and budget data is received for one or more computing services. In addition, available resources data is received for computing resources that are currently projected to be available when the one or more computing services will be implemented or provided by the resource provider 120.

At block 604, a long term resource allocation programming problem (e.g., linear or mixed integer) is generated based on the received data. In the long term resource allocation programming problem, the capacity of each computing resource facility may be considered to be infinite as additional resources may be built with a sufficiently long planning horizon, provided there is budget to pay for them (e.g., datacenter space may be built to house additional machine or computing apparatus needs). In this manner, the system focuses on finding the most cost-effective solution that maximizes the number of requested characteristics fulfilled or number of constraints satisfied given an overall budget. In the event that there is insufficient budget to satisfy all constraints, the system will attempt to satisfy the required characteristics in the prioritized order specified by the user. In the event that the budget is sufficient to satisfy all requirements, the resultant allocation may be optimal for the lowest possible cost.

At block 606, a long term resource allocation is determined based on the long term resource allocation program problem. For example, the solver 124 may evaluate the long term resource allocation programming problem to allocate the computing resources to satisfy the resource allocation objective. The output from the solver may identify the computing resources allocated to each computing service.

At block 608, a short term resource allocation programming problem is generated based on the intent data, the optional budget data, and available resources data. In some implementations, the data may be updated prior to generating the short term resource allocation programming problem. For example, the demand forecasts, capacity data for computing resources, and budget constraints may be updated. In addition, information identifying available computing resources may be updated, for example, if new computing resources were added or installed after the short term resource allocation.

The short term resource allocation programming problem may include constraints based on the actual budget amounts for the computing service(s) and based on a finite, actual capacity or quantity of available computing resources. In addition, the resource allocation objective for the short term resource allocation programming problem may be to minimize the cost for the computing resources or to maximize the efficiency of allocation.

At block 610, a short term resource allocation is determined based on the short term resource allocation program problem. For example, the solver 124 may evaluate the short term resource allocation programming problem to allocate the computing resources to satisfy the resource allocation objective. The output from the solver may identify the computing resources allocated to each computing service. In addition, the computing service(s) may be hosted on the allocated computing resources.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations disclosed herein or of what may be claimed, but rather as descriptions of features specific to particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method when executed on data processing hardware causes the data processing hardware to perform operations comprising:
   receiving a request for one or more computing resources from a plurality of computing resources to implement a computing service, each computing resource of the plurality of computing resources comprising one or more characteristics, the request comprising:
      intent data specifying multiple requested characteristics of the requested one or more computing resources to implement the computing service; and
      a resource allocation objective prioritizing at least one of the multiple requested characteristics over each other requested characteristic of the multiple requested characteristics;
   determining a first group of computing resources from the plurality of computing resources based on the intent data and the resource allocation objective, wherein, while determining the first group of computing resources, each computing resource of the plurality of computing resources is considered to have infinite capacity;
   allocating implementation of the computing service to the first group of computing resources;
   receiving an actual capacity for each computing resource of the plurality of computing resources;
   determining, using the actual capacity for each computing resource of the plurality of computing resources, a second group of computing resources from the plurality of computing resources based on the intent data and the resource allocation objective; and
   reallocating implementation of the computing service to the second group of computing resources.

2. The computer-implemented method of claim 1, wherein the operations further comprise:
   determining the second group of computing resources will exceed a budget constraint; and
   in response to determining the second group of computing resources will exceed the budget constraint, performing an action with respect to the second group of computing resources.

3. The computer-implemented method of claim 2, wherein:
   performing the action with respect to the second group of computing resources comprises determining a third group of computing resources from the plurality of computing resources; and
   the third group of computing resources is different from the second group of computing resources and will not exceed the budget constraint.

4. The computer-implemented method of claim 3, wherein performing the action with respect to the second group of computing resources comprises providing, for the computing service, access to the third group of computing resources in response to determining that allocation of the computing service to the third group of computing resources will not exceed the budget constraint.

5. The computer-implemented method of claim 2, wherein performing the action with respect to the second group of computing resources comprises sending, to a client device, data specifying the second group of computing resources and information related to the second group of computing resources.

6. The computer-implemented method of claim 1, wherein the operations further comprise:

generating a resource allocation problem for allocating computing resources to meet the resource allocation objective; and solving the resource allocation problem.

7. The computer-implemented method of claim 6, wherein solving the resource allocation problem comprises:

determining, based on allocation data, that the second group of computing resources will exceed an allocation constraint;

updating the resource allocation problem in response to determining that the second group of computing resources will exceed the allocation constraint; and determining, using the updated resource allocation problem, a third group of computing resources.

8. The computer-implemented method of claim 6, wherein the resource allocation problem comprises at least one of a linear programming problem or a mixed integer programming problem.

9. The computer-implemented method of claim 6, wherein solving the resource allocation problem includes identifying one or more underlying computing services and one or more underlying computing resources that will be used to provide the computing service using a translation function for the computing service.

10. The computer-implemented method of claim 6, wherein the resource allocation problem comprises a graph.

11. A system comprising:

data processing hardware; and memory hardware in communication with the data processing hardware, the memory hardware storing instructions that when executed by the data processing hardware cause the data processing hardware to perform operations comprising:

receiving a request for one or more computing resources from a plurality of computing resources to implement a computing service, each computing resource of the plurality of computing resources comprising one or more characteristics, the request comprising:

intent data specifying multiple requested characteristics of the requested one or more computing resources to implement the computing service; and a resource allocation objective prioritizing at least one of the multiple requested characteristics over each other requested characteristic of the multiple requested characteristics;

determining a first group of computing resources from the plurality of computing resources based on the intent data and the resource allocation objective, wherein, while determining the first group of computing resources, each computing resource of the plurality of computing resources is considered to have infinite capacity;

allocating implementation of the computing service to the first group of computing resources;

receiving an actual capacity for each computing resource of the plurality of computing resources;

determining, using the actual capacity for each computing resource of the plurality of computing resources, a second group of computing resources from the plurality of computing resources based on the intent data and the resource allocation objective; and reallocating implementation of the computing service to the second group of computing resources.

12. The system of claim 11, wherein the operations further comprise:

determining the second group of computing resources will exceed a budget constraint; and in response to determining the second group of computing resources will exceed the budget constraint, performing an action with respect to the second group of computing resources.

13. The system of claim 12, wherein:

performing the action with respect to the second group of computing resources comprises determining a third group of computing resources from the plurality of computing resources; and the third group of computing resources is different from the second group of computing resources and will not exceed the budget constraint.

14. The system of claim 13, wherein performing the action with respect to the second group of computing resources comprises providing, for the computing service, access to the third group of computing resources in response to determining that allocation of the computing service to the third group of computing resources will not exceed the budget constraint.

15. The system of claim 12, wherein performing the action with respect to the second group of computing resources comprises sending, to a client device, data specifying the second group of computing resources and information related to the second group of computing resources.

16. The system of claim 11, wherein the operations further comprise:

generating a resource allocation problem for allocating computing resources to meet the resource allocation objective; and solving the resource allocation problem.

17. The system of claim 16, wherein solving the resource allocation problem comprises:

determining, based on allocation data, that the second group of computing resources will exceed an allocation constraint;

updating the resource allocation problem in response to determining that the second group of computing resources will exceed the allocation constraint; and determining, using the updated resource allocation problem, a third group of computing resources.

18. The system of claim 16, wherein the resource allocation problem comprises at least one of a linear programming problem or a mixed integer programming problem.

19. The system of claim 16, wherein solving the resource allocation problem includes identifying one or more underlying computing services and one or more underlying computing resources that will be used to provide the computing service using a translation function for the computing service.

20. The system of claim 16, wherein the resource allocation problem comprises a graph.

* * * * *